United States Patent
Evans et al.

(10) Patent No.: US 9,294,504 B1
(45) Date of Patent: Mar. 22, 2016

(54) MULTIPLE OPERATING SYSTEM ROTATION ENVIRONMENT MOVING TARGET DEFENSE

(71) Applicant: UCHICAGO ARGONNE, LLC, Chicago, IL (US)

(72) Inventors: Nathaniel Evans, Orland Hills, IL (US); Michael Thompson, Chicago, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 14/473,031

(22) Filed: Aug. 29, 2014

(51) Int. Cl.
 *H04L 29/06* (2006.01)
 *G06F 9/44* (2006.01)

(52) U.S. Cl.
 CPC ............ *H04L 63/1466* (2013.01); *G06F 9/441* (2013.01)

(58) Field of Classification Search
 None
 See application file for complete search history.

(56) References Cited

U.S. PATENT DOCUMENTS

2014/0289867 A1* 9/2014 Bukai ............................ 726/28

* cited by examiner

*Primary Examiner* — Ghazal Shehni
(74) *Attorney, Agent, or Firm* — Foley & Lardner LLP

(57) ABSTRACT

Systems and methods for providing a multiple operating system rotation environment ("MORE") moving target defense ("MTD") computing system are described. The MORE-MTD system provides enhanced computer system security through a rotation of multiple operating systems. The MORE-MTD system increases attacker uncertainty, increases the cost of attacking the system, reduces the likelihood of an attacker locating a vulnerability, and reduces the exposure time of any located vulnerability. The MORE-MTD environment is effectuated by rotation of the operating systems at a given interval. The rotating operating systems create a consistently changing attack surface for remote attackers.

20 Claims, 4 Drawing Sheets

MULTIPLE OPERATING SYSTEM ROTATION ENVIRONMENT MOVING TARGET DEFENSE

STATEMENT OF GOVERNMENT INTEREST

The U.S. Government has rights in this invention pursuant to Contract No. DE-AC-02-06CH11357 between the U.S. Government and the UChicago Argonne, LLC representing Argonne National Laboratory.

FIELD

The present disclosure relates generally to systems that thwart cyber-attacks by employing moving target defense ("MTD" hereafter). In particular, the disclosure relates to systems that utilize multiple operating system rotation environment ("MORE" hereafter) MTD to counter cyber-attack attempts.

BACKGROUND

Cyber-attacks continue to pose a major threat to computing systems. As shown in FIG. 1, in a typical client-server computing system 100, a client device 102 interacts with a host computer 104 (e.g., a virtual machine, a host computer, etc.). A typical client device 102 is primarily concerned with accessing the application layer 106 of the host computer 104 (e.g., the application the user is attempting to access). The client device 102 typically does not directly interact with the application platform layer 108 or the operating system 110 of the host computer 104. Through the application layer 106, the client device 102 can access data stored in a data storage device 112. The data, for example, may relate to a database presented on the client device 102 via the application layer 106. Unlike the client device 102, an attacker device 114 (e.g., a device operated by a hacker) is not authorized to access the host computer 104. The attacker device 114 can attempt to interact with any of the application layer 106, the application platform layer 108, or the operating system 110 in an attempt to discover and exploit a vulnerability in the host computer 104 to gain access to data in the data storage device 112 or the client device 102.

In the client-server computing system 100, the host computer 104 remains relatively static creating a static environment. The operating system 110 and the application platform 108 code, although regularly updated, can remain in substantially the same form or state for days, weeks, months, or even years at a time between successive updates. Accordingly, the attacker device 114 has the opportunity to try multiple types of attacks on the various layers as long as the host computer 104 is online. For example, the attacker device 114 can continuously attempt to locate a new, unknown vulnerabilities in the software (e.g., the application layer 106, the application platform 108, the operating system 110, etc.) of the host computer 104 through a plurality of attack methods. If a vulnerability is located, the attacker device 114 can exploit the vulnerability to gain access to the host computer 104 and potentially to the client device 102 and the data storage device 112. If the user of the attacker device 114 is dedicated enough, the attacker device 114 can continuously attack the various layers of the host computer 104 until a vulnerability is located. Such static systems are particularly vulnerable to zero-day attacks (e.g., an attack that exploits a previously unidentified vulnerability).

SUMMARY

One embodiment relates to a computer-implemented method of providing a multiple operating system rotation environment. The method includes providing an application to a remote user via a first host device accessible to the remote user through an external network, the first host device having a first operating system, the first device positioned in an active position within the multiple operating system rotation environment. The method further includes receiving, by an administrator device in communication with the first host device through an internal network, status information from the first host device. The method includes synchronizing, by the administrator device, a second host device with the first host device, the second host device having a second operating system. The method further includes performing, by the administrator device, a handoff operation from the first host device to the second host device after a period of time such that the application is provided to the remote user via the second host device though the external network.

One embodiment relates to a non-transitory computer-readable media having computer-executable instructions embodied therein that, when executed by a processor of an administrator device of a multiple operating system rotation environment, cause the administrator device to perform a method. The media includes instructions that cause the administrator device to provide an application to a remote user via a first host device accessible to the remote user through an external network, the first host device having a first operating system, the first device positioned in an active position within the multiple operating system rotation environment. The media includes instructions that cause the administrator device to receive status information from the first host device. The media includes instructions that cause the administrator device to synchronize a second host device with the first host device, the second host device having a second operating system. The media includes instructions that cause the administrator device to perform a handoff operation from the first host device to the second host device after a period of time such that the application is provided to the remote user via the second host device though the external network.

One embodiment relates to a multiple operating system rotation environment computing system. The system includes a plurality of host devices including a first host device and a second host device, the plurality of host devices configured to provide an application to a remote user through an external network, each of the plurality of hosts includes a different operating system. The system further includes an administrator device in communication with the plurality of host devices through an internal network. The administrator device is configured to provide the application to the remote user via the first host device via the external network when the first device is positioned in an active position within the multiple operating system rotation environment. The administrator device is further configured to receive status information from the first host device. The administrator device is configured to synchronize the second host device to the first host device. The administrator device is further configured to perform a hand-off operation from the first host device to the second host device after a period of time such that the application is provided to the remote user via the second host device though the external network These and other advantages and features of the invention, together with the organization and manner of operation thereof, will become apparent from the following detailed description when taken in conjunction with the accompanying drawings.

DETAILED DESCRIPTION

Referring to the figures generally, systems and methods for utilizing MORE-MTD to provide enhanced computer system security through a rotation of multiple operating systems is described. MORE-MTD is a proactive defense (e.g., not reactive to identified attacks) effectuated by a rotation of operating systems, thereby increasing attacker uncertainty and the cost of attacking while reducing the likelihood of an attacker locating a vulnerability and reducing the exposure time of any located vulnerability. The MORE-MTD environment is effectuated by rotation of the operating systems at a given interval. The rotating operating systems create a consistently changing attack surface for remote attackers. The rotating operating systems help isolate and protect back-end data stores from potential impacts that could result from exploits of zero-day vulnerabilities. A zero-day attack occurs when a previously unknown vulnerability in a computer application is exploited on "day zero" of awareness. The MORE MTD environment prevents an attacker from having sufficient time to exploit these zero-day vulnerabilities by ensuring that the forward facing operating system changes before the attacker can execute any code to exploit the vulnerability. The host that the attacker is targeting will have been rotated out of the forward-facing position before the attacker can cause a significant amount of damage or before a vulnerability is located.

Figure 1:
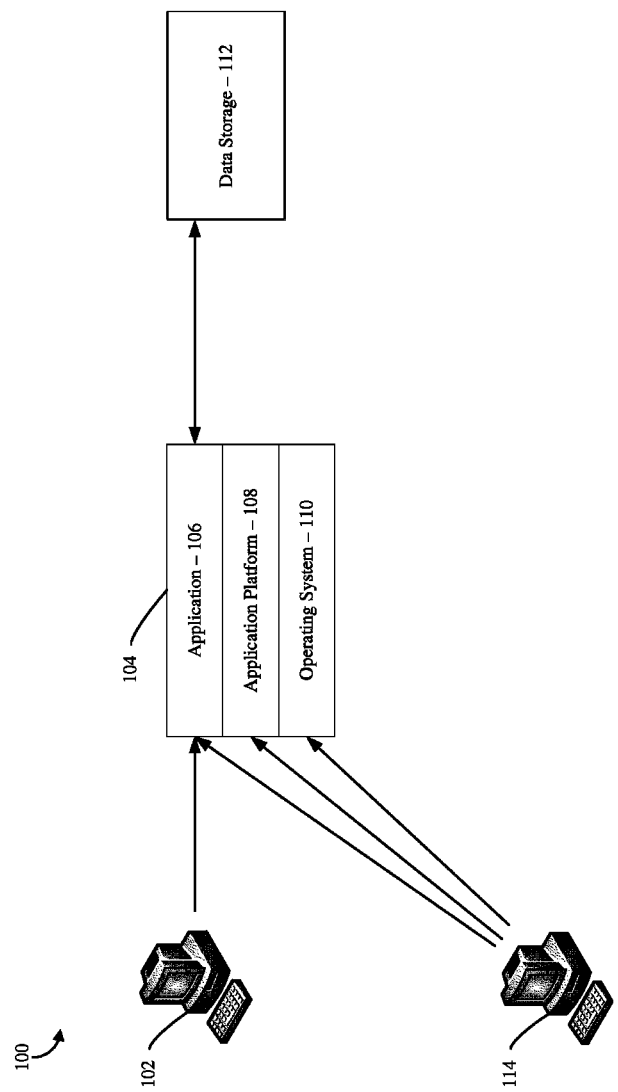
FIG. 1 is a block diagram of a computing system.
Figure 2:
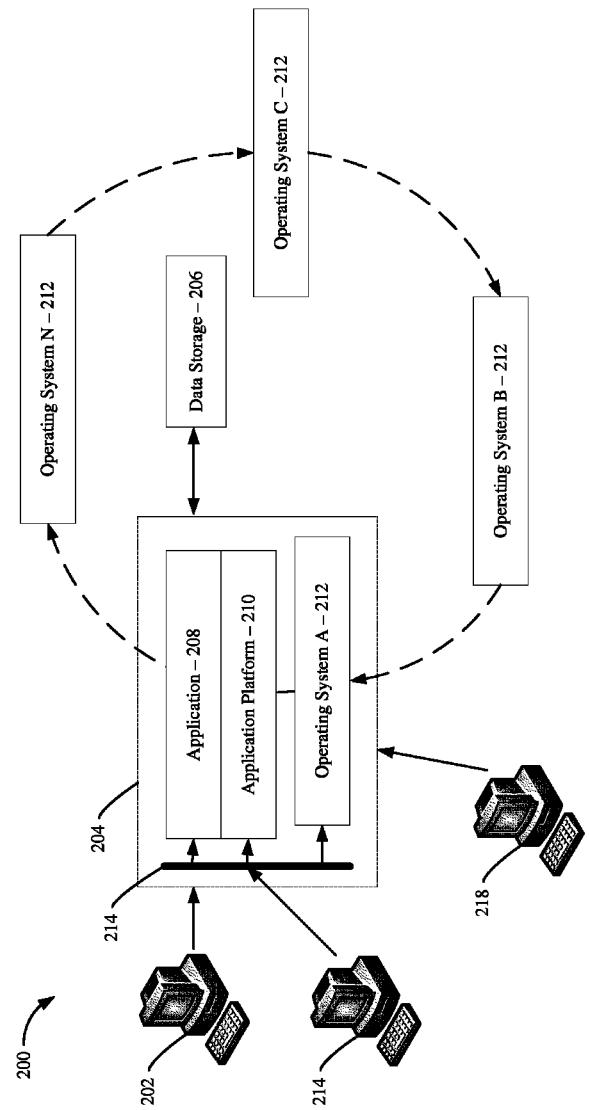
FIG. 2 is a block diagram of a MORE-MTD computing system according to an exemplary embodiment.

Referring to FIG. 2, a block diagram of a computing system 200 is shown according to an exemplary embodiment. The computing system 200 provides remote services (e.g., a remote desktop, a website, an application, etc.) to computing devices, such as client device 202, via a host device 204. The host device 204 may be a virtual machine based on data in the data storage device 206. Generally, the client device 202 communicates with the host device 204 via the application 208 of the host device 204. The host device 204 also includes an application platform 210 and an operating system 212. The operating system 212 manages the resources of the host device 204 and provides an interface for applications (application 208) to utilize the hardware of the host device 204. The application platform 210 allows the application 208 to communicate with the operating system 212. Through the application 208, the client device 202 can access data stored in the data storage device 206. Generally, the users of the client device 202 are authorized (e.g., by an administrator of system 200) to access the application 208.

Attackers (e.g., hackers), can also access the host device 204 via attacker devices, such as attacker device 214. Attackers, unlike the users of the client device 202, generally are not authorized to access the application 208. Attackers utilize the attacker device 214 to locate and exploit vulnerabilities in the host device 204. By exploiting vulnerabilities in the host device 204, the attackers may gain access to the data in the data storage device 206 or data stored on the client device 202. Additionally, the attacker may damage the host device 204, the client device 202, or the data storage device 206. The vulnerability identified by the attacker may be located by searching for zero-day vulnerabilities, which can result in a zero-day attack on the computing system 200. A zero-day attack occurs when a previously unknown vulnerability in the computing system 200 application is exploited on "day zero" of awareness. Accordingly, a zero-day vulnerability is a vulnerability that has not been previously identified such that it cannot have been fixed by a system administrator. Attackers often focus their attacks on the application 208, the application platform 210, and the operating system 212 to search for the zero-day vulnerabilities. Accordingly, the application 208, the application platform 210, and the operating system 212 form an attack surface 216 for the attacker device 214. The search for zero-day vulnerabilities can require the attacker device 214 to remain connected to the host device 204 for extended periods of time.

However, unlike system 100, system 200 is a dynamic computing system. System 200 presents a dynamic attack surface 216 by periodically rotating the operating system 212. The operating system 212 is decoupled from the host device 204, and a plurality of different operating systems 212 are periodically rotated for use by the host device 204. For example, after a designated time interval, operating system A is rotated (i.e., substituted out for) with operating system B. In some arrangements, the rotation of the operating systems 212 is achieved by rotation of plurality of virtual machines, each of the virtual machines including a different operating system 212. The number of operating systems 212 utilized by the computing system 200 must be greater than one. The number of operating systems 212 can be any number greater than one. The designated time interval between operating system changes can be a consistent time interval or a variable time interval (e.g., a random amount of time). The rotation of the operating systems 212 is controlled from an administrator machine 218, such as a remote server. In some arrangements, the administrator machine 218 is running a daemon process that controls the rotation of the operating systems.

By consistently rotating the operating systems 212, the attack surface 216 consistently changes and is not static. The attack surface 216 remains constant only for the time interval between operating system 212 changes. Accordingly, the attacker device 214 has a limited time period (e.g., a designated time interval) to locate a zero-day vulnerability, thereby reducing the chances that the attacker device 214 successfully finds a zero-day vulnerability. The likelihood that an attacker device 214 successfully finds and exploits a vulnerability in system 200 may be proportional to the amount of the designated time interval between successive implementations of the operating systems 212. Further, even if a vulnerability is located, the attacker can only exploit the vulnerability for the duration of the time interval (or the amount of time remaining in the time interval after the exploit is identified). Thus, even if an exploit is successfully located by an attacker device 214, the exploit survives for only the duration of the specific operating system 212 rotation. Accordingly, the computing system 200 has increased security and a decreased risk of zero-day attacks in comparison to computing system 100.

After rotation out of the host device 204, the operating system (e.g., Operating System N as shown in FIG. 2) is analyzed for evidence of intrusion by an attacker. In some arrangements, the intrusion detection is completed using a file system baseline integrity checker. The amount of time the detection takes for each operating system may affect the designated time interval If evidence of an intrusion in the operating system 212 is located, the compromised operating system 212 is removed from the rotation of operating systems until the exploited vulnerability is repaired. After the vulnerability is repaired, the operating system 212 can be returned back to the rotation of operating systems by the administrator machine 218. The same principles of the MORE-MTD environment can be applied to other layers of the host device 204, such as the application platform 210 or to the entire host device 204 itself (e.g., a plurality of hosts are rotated amongst each other as described below with respect to FIG. 3).

Figure 3:
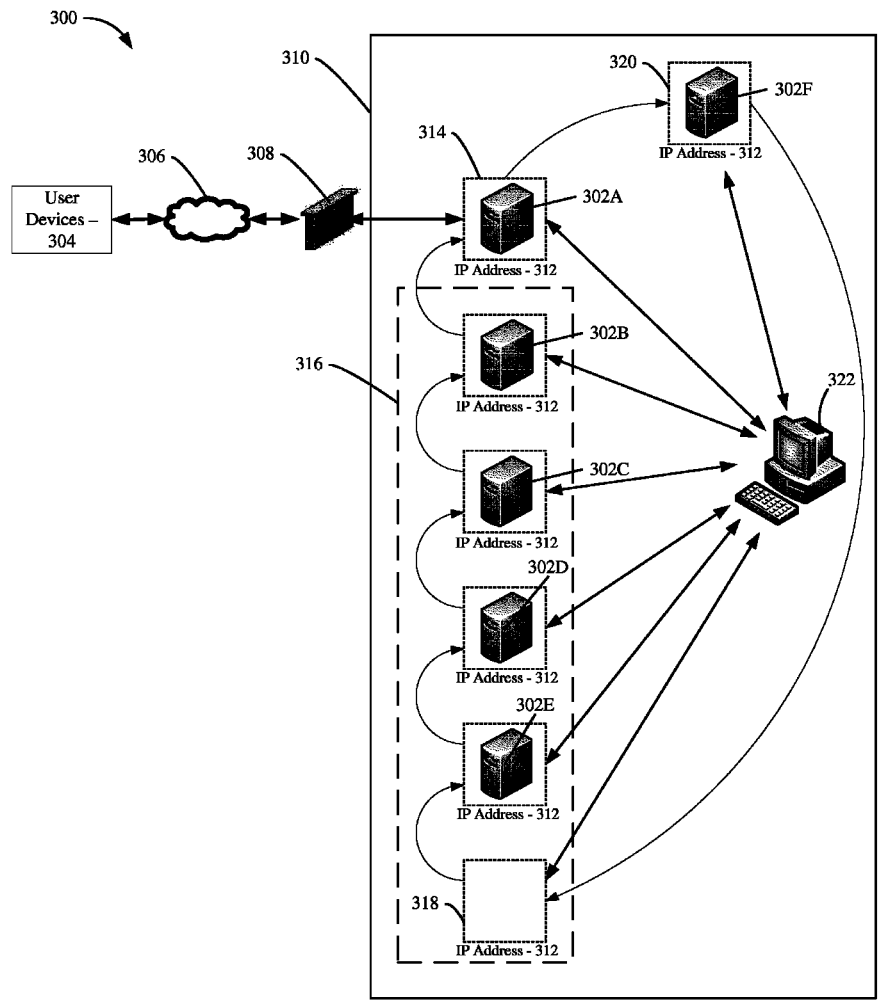
FIG. 3 is a block diagram of a MORE-MTD computing system according to another exemplary embodiment.

Referring to FIG. 3, a computing system 300 employing a MORE-MTD environment is shown according to an exemplary embodiment. Computing system 300 is similar to computing system 200. System 300 provides a dynamic computing environment by employing a MORE-MTD environment via rotation of a plurality of host devices 302A-302F. Although shown as using six host devices 302A-302F, any number of host devices greater than two may be used in system 300. Each host device 302A-302F is a virtual machine equipped with a different operating system and the same application provided to users of the system 300. The different operating system may include different versions of the same operating system, different operating systems entirely (e.g., some host devices 302 utilize Microsoft® Windows® while other host devices utilize Unix, etc.), or a combination thereof. The application is accessed remotely by a plurality of user devices 304 via a network 306, such as the Internet. The plurality of user devices 304 includes both authorized users (e.g., users that are authorized to access the application on the host devices 302A-302F) and unauthorized users (e.g., users that are not authorized to access the application on the host devices 302A-302F). The unauthorized users may be attackers or hackers that are attempting to gain unauthorized access to the computing system 300 and any information stored in the computing system 300. The computing system 300 includes an external IP address 308 used by the user devices 304 to access the computing system 300 via the network 306. External traffic from the user devices 304 is transparently passed to the host devices 302 via a private network 310 within the computing system 300. Each host device 302 is within the private network 310. Each host device 302 may be assigned a unique internal IP address 312 within the private network 310. The unique internal IP address 312 is dependent on the position of each host device 302 within the computing system 300. There are n+1 unique internal IP addresses 312 within the private network 310, where n is the number of host devices 302. In the embodiment illustrated in FIG. 3, there are seven unique internal IP addresses 312. As described in further detail below, the internal IP addresses 312 are linked to positions within the computing system 300 and are not tied to the individual host devices 302.

As shown in FIG. 3, host device 302A is in the active position 314. The active position 314 carries a designated unique internal IP address 312 that transparently receives external traffic via the external IP address 308. The host device 302 in the active position 314 (and thus assigned the internal IP address 312 associated with the active position 314) faces the outside world (i.e., host device 302A is forward-facing). Accordingly, host device 302A is able to communicate with the user devices 304 via the external IP address 308 and the network 306. The host device in the active position 314 is the only host device accessible by the user devices 304. The system 300 includes a queue 316 of inactive host devices (shown as host devices 302B-302E). Each position within the queue 316 is assigned one of the unique internal IP addresses 312, including an empty position 318. The empty position 318 accounts for the "+1" position in the above described n+1 number of internal IP addresses 312. Here, the queue 316 includes openings for five host devices 302, including the empty position 318. Four of the openings in the queue 316 are occupied by host devices 302B-302E. Additionally, in one embodiment, the system 300 includes a quarantine position 320. Similar to every other position, the quarantine position 320 includes a unique IP address 312. In an alternate arrangement, the quarantine position 320 does not include a unique IP address 312 with the private network 310. As shown in FIG. 3, the quarantine position 320 is occupied with host device 302F, where host devices are analyzed for evidence of intrusion by an attacker.

During provision of the application to the user devices 304 via the host devices 302, an administrator device 322 periodically rotates the host devices 302 into and out of the active position 314. The host devices 302 are rotated as indicated by the one-way flow arrows between each position within the computing system 300. For example, a host device that begins at the bottom position of the queue 316 periodically moves up the queue 316 until the host device is rotated into the active position 314, and from there, the host device remains in the active position 314 for a period of time until the host device is rotated to the quarantine position 320. While in the quarantine position 320, the administrator device 322 analyzes the host device for evidence of an intrusion (e.g., a hacker attack). If no evidence is found, the host device is returned to queue 316 at the empty position 318, where the process repeats. If evidence is found, the host device may be removed from the computing system 300 until the host device is repaired and patched. In an alternate arrangement, the rotation of the host devices 302 into the active position 314 is random. In such an arrangement, any host devices 302 within the queue 316, which resembles more of a pool of devices, are eligible for immediate rotation into the active position 314 regardless of their order within the queue 316.

During operation of the computing system 300, the user devices 304 access the application via the external IP address 308. The administrator device 322 communicates with the host device in the active position 314 to receive application status information. The administrator device 322 syncs each instance of the application on the host devices 302 in the queue 312 based on the status information of the host device in the active position 314. The administrator device 322 communicates with each host device 302 via the private network 310 associated with the unique internal IP addresses 312. Upon the expiration of a designated period of time, the administrator device 316 rotates the host devices 302. Rotation of the host devices 302 includes a performing a handoff operation from the host device in the active position 314, shown as host device 302A, and the host device that is next-in-line in the queue 316, shown as host device 302B. The handoff operation provides a seamless or near-seamless application experience to the plurality of user devices 304. The previously active host device, in this case host device 302A, is moved to the quarantine position 320 for analysis, and then either back in the queue 316 or out of service depending on the results of the analysis. The actual rotation of the host devices 302 is achieved by switching the internal IP addresses 312 of the host devices 302 to desired position. In some arrangements, a daemon process running on the administrator device 322 controls the rotation of the host devices 302.

When a host device is moved from the active position 314 to the quarantine position 320, the host device is analyzed for evidence of intrusion by an attacker. In some arrangements, the intrusion detection is completed by the administrator device 322 through a file system baseline integrity checker. If evidence of an intrusion in the host device in the quarantine position 320 is identified, the host device in the quarantine position 320 is removed from the rotation of host devices 302 operating systems until the exploited vulnerability is repaired. After the vulnerability is repaired, the host device can be returned back to the rotation of host devices 302 by the administrator device 322. In some situations, all host devices 302 in the rotation may become affected by attackers. In these situations where the administrator device 322 was reduced to having only one live host device in its configuration, the administrator device 322 may notify an administrator (e.g., a technician) of the status of system 300 via an alert (e.g., an e-mail message, a text message, an audible tone, etc.), cease host rotation, and leave the existing host device 302 in the active position 314. In an alternative arrangement, the administrator device 322 may place no host devices in the active position 314 causing the system 300 to become nonoperational until a clean host device is available.

Figure 4:
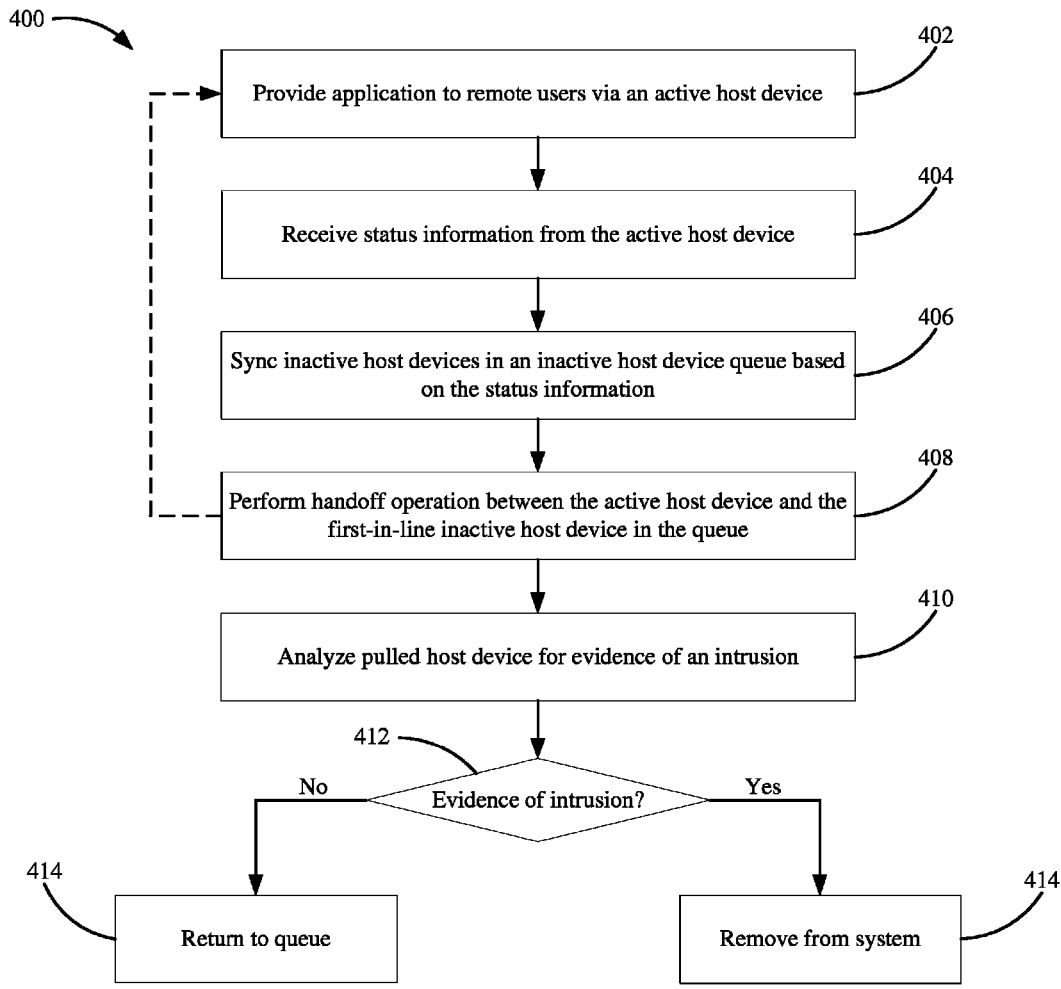
FIG. 4 is a flow diagram of a method of operating a MORE-MTD computing environment according to an exemplary embodiment.

Referring to FIG. 4, a flow diagram of a method 400 of operating a MORE-MTD computing environment is shown according to an exemplary embodiment. The method 400 is carried out by a system administrator device (e.g., device 218 or device 322) of a computing system (e.g., system 200 or system 300) that provides an application to a remote computing device. The computing system provides a MORE-MTD computing environment through rotation of a plurality of host devices that provide an application to at least one remote user via at least one remote device (e.g., device 202, user devices 304, etc.). The MORE-MTD computing environment is created through periodic rotation of the host devices into and out of an active position according to method 400. When a host device is in the active position, that host device is forward-facing such that it can communicate with external devices such as the above described remote device.

Method 400 begins when a host device provides an application to remote users at 402. The host device providing the application to the remote users is in the active position. The host device is the only device in the active position at the time of 402. Accordingly, only one host device provides the application to the remote users at any given time. The host device is accessed by the remote users via a first network (e.g., network 306, the Internet, etc.). When the host device is in the active position, status information is received from the active host device at 404. The status information is received by the administrator device. The administrator device communicates with the host devices via a private network (e.g., network 310). The private internal network is not directly accessible by the remote users. The status information relates to a status of the application as accessed by the remote user. The status information includes information relating to what the user is doing on the application (e.g., what the user interface of the application looks like, where a user input cursor is on the user interface, etc.) such that other non-active host devices can be synchronized with the active host device. Based on the received status information, the inactive host devices are synchronized with the active host devices at 406. The inactive host devices are in a queue (e.g., host devices 302B-302E in queue 316). Each inactive host device in the queue will eventually be rotated into the active position. The administrator device communicates the status information to each inactive host device via the private internal network not accessible by the remote users.

A handoff operation between the active host device and the first-in-line of the inactive host devices in the queue is performed at 408. The handoff operation is triggered and carried out by the administrator device after a defined period of time. The administrator device may be running a daemon process that controls the handoff operation. The defined period of time relates to the amount of time between successive handoff operations (e.g., the amount of time any given host remains in the active position). The defined period of time may be a fixed period of time or a fluctuating period of time. In arrangements where a fluctuating period of time is used, the amount of time may be randomly selected within a defined range of acceptable time periods (e.g., any amount of time between 30 seconds and 5 minutes). During the handoff operation, the host device in the active position is removed from the active position, and the first-in-line of the inactive host devices in the queue is moved to the active position. In an alternate arrangement, a random host device within the queue is moved into the active position regardless of the host device's position within the queue. The handoff operation provides a seamless or substantially seamless user experience for the remote users accessing the application provided by the host devices. In some arrangements, the administrator device effectuates the handoff operation by changing the IP addresses of the host devices involved with the handoff operation (e.g., as described above with respect to system 300). In some arrangements, each host device remaining in the queue has their respective IP addresses shifted to move up a position within the queue.

The host that was pulled from the active position during the handoff is analyzed for evidence of an intrusion (410). In some arrangements, the analysis is performed by the administrator device. In other arrangements, the analysis is performed by a dedicated network security device within the internal private network. The intrusion detection may include performing a file system baseline integrity check. In certain arrangements, the integrity check includes a comparison of the files on the host with a master set of files to search for differences that may have resulted from an intrusion by an attacker. The comparison may be performed by generating a host hash string of all of the files on the host or a portion of the files on the host and comparing the host hash string to a master hash string of the master set of files.

The administrator device determines if evidence of an intrusion by an unauthorized user was located at 412. If no evidence of an intrusion was identified, the pulled host device is returned to the queue of inactive host devices at 414. The administrator device assigns the pulled host device an IP address within the internal private network associated with the last-in-line position within the queue. If evidence of an intrusion was located, the pulled host device is removed from the computing system at 416. Upon detection of an intrusion, the administrator device removes the pulled host device from the rotation of host devices in the computing system. In some arrangements, the administrator device may initiate an alert to a system technician indicating that evidence of the intrusion was identified. Accordingly, the pulled host device is not returned back to the queue and is not eligible to return to the active position. The pulled host remains out of the rotation of host devices until the host is repaired (e.g., until the operating system of the host is patched to prevent the intrusion from happening again). If the pulled host is repaired, the pulled host is returned to the queue as done in 414.

In method 400, the host devices continuously rotate as long as there are at least two valid host devices (i.e., one host device for the active position and at least one host device for the inactive queue). Accordingly 402-408 are repeated as long as there are at least two valid host devices. The number of host devices in the inactive queue fluctuates based on the analysis performed in 410-414. In situations in which only one host device remains, no rotation of host devices (e.g., no handoff operations at 408) are performed because there are no devices in the queue. In such situations, the administrator device may initiate an alert to a system technician alerting the technician that the MORE-MTD environment has been reduced to a single active host device. If the single remaining host device falls to an attack, the computing system may shut down and stop provision of the application to remote users.

The above-described systems and methods provide enhanced system and data security with minimal end user impact compared to non-MORE-MTD computing environments. The described MORE-MTD computing environments provide the enhanced system and data security by utilizing rotating, forward-facing operating systems that both limit the time an attacker has to locate a vulnerability (e.g., a flaw in the operating system's security) in the computing system and limit the time that an attacker has to exploit any discovered vulnerability. Further, any discovered vulnerability of a given operating system can be addressed such that there is zero loss of availability to end users by rotating in a new operating system. The operating system rotation also provides developers and system admins time to patch and test a given operating system's vulnerabilities while other operating systems continue to serve (i.e., "rotate") the application to the end users. The rotation also significantly limits the success of automated operating system penetration tools by the constantly shifting attack surface.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable or non-transitory storage media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of executable instructions or associated data structures represents examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method of providing a multiple operating system rotation environment, the method comprising:
   providing an application to a remote user via a first host device accessible to the remote user through an external network, the first host device having a first operating system, the first host device positioned in an active position within the multiple operating system rotation environment;
   receiving, by an administrator device in communication with the first host device through an internal network, status information from the first host device;
   synchronizing, by the administrator device, a second host device with the first host device, the second host device having a second operating system; and
   performing, by the administrator device, a handoff operation from the first host device to the second host device after a period of time such that the application is provided to the remote user via the second host device through the external network.

2. The method of claim 1, further comprising analyzing, by the administrator device and after performing the handoff operation, the first host device for evidence of an intrusion by an unauthorized user.

3. The method of claim 2, further comprising:
   identifying, by the administrator device, evidence of the intrusion on the first host device; and
   removing the first host device from a rotation of host devices.

4. The method of claim 2, further comprising:
   determining, by the administrator device, that there is no evidence of the intrusion on the first host device; and
   returning, by the administrator device, the first host device to a queue of inactive host devices for later rotation into the active position.

5. The method of claim 2, wherein analyzing the first host device for evidence of the intrusion includes performing a file system baseline integrity check of the first host device.

6. The method of claim 1, wherein the performing the handoff operation includes changing an IP address of the first host device on the internal network.

7. The method of claim 1, wherein the period of time is a random period of time.

8. The method of claim 1, wherein the handoff operation is a first handoff operation, and the method further comprises performing, by the administrator device, a second handoff operation from the second host device to a third host device after a second period of time such that the application is provided to the remote user via the third host device through the external network.

9. A non-transitory computer-readable media having computer-executable instructions embodied therein that, when executed by a processor of an administrator device of a multiple operating system rotation environment, cause the administrator device to:
   provide an application to a remote user via a first host device accessible to the remote user through an external network, the first host device having a first operating system, the first host device positioned in an active position within the multiple operating system rotation environment;
   receive status information from the first host device;
   synchronize a second host device with the first host device, the second host device having a second operating system; and
   perform a handoff operation from the first host device to the second host device after a period of time such that the application is provided to the remote user via the second host device through the external network.

10. The media of claim 9, further comprising instructions that cause the administrator device to analyze, after performing the handoff operation, the first host device for evidence of an intrusion by an unauthorized user.

11. The media of claim 10, further comprising instructions that cause the administrator device to:
    identify evidence of the intrusion on the first host device; and
    remove the first host device from a rotation of host devices.

12. The media of claim 10, further comprising instructions that cause the administrator device to:
    determine that there is no evidence of the intrusion on the first host device; and
    return the first host device to a queue of inactive host devices for later rotation into the active position.

13. The media of claim 10, wherein analyzing the first host device for evidence of the intrusion includes performing a file system baseline integrity check of the first host device.

14. The media of claim 9, wherein the performing the handoff operation includes changing an IP address of the first host device on the internal network.

15. The media of claim 9, wherein the handoff operation is a first handoff operation, and the media further comprises instructions that cause the administrator device to perform a second handoff operation from the second host device to a third host device after a second period of time such that the application is provided to the remote user via the third host device through the external network.

16. A multiple operating system rotation environment computing system comprising:
    a plurality of host devices including a first host device and a second host device, the plurality of host devices configured to provide an application to a remote user through an external network, each of the plurality of host devices includes a different operating system;
    an administrator device in communication with the plurality of host devices through an internal network, the administrator device configured to:
    provide the application to the remote user via the first host device via the external network when the first host device is positioned in an active position within the multiple operating system rotation environment;
    receive status information from the first host device;
    synchronize the second host device to the first host device; and
    perform a handoff operation from the first host device to the second host device after a period of time such that the application is provided to the remote user via the second host device through the external network.

17. The system of claim 16, wherein the administrator device is further configured to analyze, after performing the handoff operation, the first host device for evidence of an intrusion by an unauthorized user.

18. The system of claim 17, wherein the administrator device is further configured to:
    identify evidence of the intrusion on the first host device; and
    remove the first host device from a rotation of host devices.

19. The system of claim 17, wherein the administrator device is further configured to:
    determine that there is no evidence of the intrusion on the first host device; and return the first host device to a queue of inactive host devices for later rotation into the active position.

20. The system of claim 16, wherein the handoff operation is a first handoff operation, and wherein the administrator device is further configured to perform a second handoff operation from the second host device to a third host device after a second period of time such that the application is provided to the remote user via the third host device through the external network.

* * * * *